United States Patent [19]
Kim et al.

[11] Patent Number: 5,683,593
[45] Date of Patent: Nov. 4, 1997

[54] METHOD FOR MANUFACTURING A THIN FILM ACTUATED MIRROR ARRAY

[75] Inventors: Joon-Mo Kim; Young-Jun Choi, both of Seoul, Rep. of Korea

[73] Assignee: Daewoo Electronics Co., Ltd., Seoul, Rep. of Korea

[21] Appl. No.: 610,317

[22] Filed: Mar. 4, 1996

[30] Foreign Application Priority Data

Mar. 17, 1995 [KR] Rep. of Korea .................. 95-5514
Mar. 17, 1995 [KR] Rep. of Korea .................. 95-5517

[51] Int. Cl.$^6$ .................. B44C 1/22; C03C 15/00
[52] U.S. Cl. .................. 216/24; 216/18; 216/39; 216/99
[58] Field of Search .................. 216/2, 18, 24, 216/39, 97, 99; 359/855

[56] References Cited

U.S. PATENT DOCUMENTS 5,589,084  12/1996  Ji et al. .................. 216/24

Primary Examiner—William Powell
Attorney, Agent, or Firm—Anderson Kill & Olick, P.C.

[57] ABSTRACT

An inventive method for manufacturing an array of thin film actuated mirrors for use in an optical projection system includes the steps of: (1) providing an active matrix; (2) depositing a thin film sacrificial layer; (3) ion-implanting the thin film sacrificial layer; (4) creating an array of empty cavities; (5) depositing an elastic layer; (6) forming an array of conduits; (7) depositing a second thin film, a thin film electrodisplacive and a first thin film layers, successively, thereby forming a multiple layered structure; (8) patterning the multiple layered structure into an array of semifinished actuated mirrors; (9) forming a thin film protection layer covering each of the semifinished actuated mirrors; (10) removing the thin film sacrificial layer by using an etchant; (11) rinsing away the etchant by using a rinse; (12) removing the rinse; and (13) removing the thin film protection layer, thereby forming the array of thin film actuated mirrors.

9 Claims, 7 Drawing Sheets

METHOD FOR MANUFACTURING A THIN FILM ACTUATED MIRROR ARRAY

FIELD OF THE INVENTION

The present invention relates to an optical projection system; and, more particularly, to an improved method for manufacturing an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, thin film actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 10 of M×N thin film actuated mirrors 11, wherein M and N are integers, disclosed in a copending commonly owned application, U.S. Ser. No. 08/430,628, filed Apr. 28, 1995, now U.S. Pat. No. 5,636,070, entitled "THIN FILM ACTUATED MIRROR ARRAY".

The process for manufacturing the array 10 begins with the preparation of an active matrix 20 having a top surface, and comprising a substrate 22, an array of M×N transistors (not shown) and an array of M×N connecting terminals 24.

In a subsequent step, there is formed on the top surface of the active matrix 20 a thin film sacrificial layer 40 by using a sputtering or an evaporation method if the thin film sacrificial layer 40 is made of a metal, a chemical vapor deposition(CVD) or a spin coating method if the thin film sacrificial layer 40 is made of a phosphor-silicate glass (PSG), or a CVD method if the thin film sacrificial layer 40 is made of a poly-Si.

Thereafter, there is formed a supporting layer 15 including an array of M×N supporting members 30 surrounded by the thin film sacrificial layer 40, wherein the supporting layer 15 is formed by: creating an array of M×N empty slots(not shown) in the thin film sacrificial layer 40 by using a photolithography method, each of the empty slots being located around the connecting terminals 24; and forming a supporting member 30 in each of the empty slots by using a sputtering or a CVD method, as shown in FIG. 1A. The supporting members 30 are made of an insulating material.

In a following step, an elastic layer 70 made of the same insulating material as the supporting members 30 is formed on top of the supporting layer 15 by using a Sol-Gel, a sputtering or a CVD method.

Subsequently, a conduit 35 made of a metal is formed in each of the supporting members 30 by: first creating an array of M×N holes(not shown), each of the holes extending from top of the elastic layer 70 to top of the connecting terminals 24, by using an etching method; and filling therein with the metal to thereby form the conduit 35, as shown in FIG. 1B.

In a next step, a second thin film layer 60 made of an electrically conducting material is formed on top of the elastic layer 70 including the conduits 35 by using a sputtering method. The second thin film layer 60 is electrically connected to the transistors through the conduits 35 formed in the supporting members 30.

Then, a thin film electrodisplacive layer 80 made of a piezoelectric material, e.g., lead zirconium titanate(PZT), is formed on top of the second thin film layer 60 by using a sputtering, a Sol-Gel or a CVD method, as shown in FIG. 1C.

In an ensuing step, the thin film electrodisplacive layer 80, the second thin film layer 60 and the elastic layer 70 are patterned into an array of M×N thin film electrodisplacive members 85, an array of M×N second thin film electrodes 65 and an array of M×N elastic members 75 by using a photolithography or a laser trimming method until the supporting layer 15 is exposed, as shown in FIG. 1D. Each of the second thin film electrodes 65 is connected electrically to the transistor through the conduit 35 formed in each of the supporting members 30 and functions as a signal electrode in the thin film actuated mirrors 11.

Next, each of the thin film electrodisplacive members 85 is heat treated to allow a phase transition to take place to thereby form an array of M×N heat treated structures(not shown). Since each of the thin film electrodisplacive members 85 is sufficiently thin, there is no need to pole it in case it is made of a piezoelectric material: for it can be poled with the electric signal applied during the operation of the thin film actuated mirrors 11.

After the above step, an array of M×N first thin film electrodes 55 made of an electrically conducting and light reflecting material is formed on top of the thin film electrodisplacive members 85 by first forming a layer 50, made of the electrically conducting and light reflecting material, completely covering the array of M×N heat treated structures, including the exposed supporting layer 15, using a sputtering method, as shown in FIG. 1E, and then selectively removing the layer 50, using an etching method, resulting in an array 90 of M×N actuated mirror structures 95, wherein each of the actuated mirror structures 95 includes a top surface and four side surfaces, as shown in FIG. 1F. Each of the first thin film electrodes 55 functions as a mirror as well as a bias electrode in the thin film actuated mirrors 11.

The preceeding step is then followed by completely covering the top surface and the four side surfaces in each of the actuated mirror structures 95 with a thin film protection layer(not shown).

The thin film sacrificial layer 40 in the supporting layer 15 is then removed by using an etching method. Finally, the thin film protection layer is removed to thereby form the array 10 of M×N thin film actuated mirrors 11, as shown in FIG. 1G.

There are certain deficiencies associated with the above described method for manufacturing an array 10 of M×N thin film actuated mirrors 11. To remove the thin film sacrificial layer 40 in the supporting layer 15 to create a driving space of each of the thin film actuated mirrors 11 by using an etching method, an etchant is inserted through the gaps between the actuated mirror structures 95 covered with the thin film protection layer. However, a complete removal of the thin film sacrificial layer 40 takes extremely long time using this approach and moreover, the thin film sacrificial layer 40 may not be completely removed, leaving remnants thereof in the intended driving space, which will, in turn, degrade the performance of the thin film actuated mirror 11 thus affected. When enough of the thin film actuated mirrors 11 are affected, the performance of the array 10 may also degrade.

In addition, the removal of the thin film sacrificial layer 40 by using the etchant is, generally, followed by a rinsing of the etchant used by using a rinse, e.g., distilled water or methanol, and then by a removal of the rinse by evaporating thereof. During the removal of the rinse, however, the surface tension of the rinse may pull the elastic member 75 down toward the active matrix 20, thereby sticking the elastic member 75 to the active matrix 20, affecting the performance of the respective thin film actuated mirror 11. When enough of the thin film actuated mirrors 11 are thus affected, the overall performance of the array 10 may also degrade.

SUMMARY OF THE INVENTION

It is, therefore, a primary object of the present invention to provide a method for manufacturing an array of M×N thin film actuated mirrors for use in an optical projection system capable of facilitating a complete removal of the thin film sacrificial layer.

It is another object of the present invention to provide a method for manufacturing an array of M×N thin film actuated mirrors for use in an optical projection system capable of reducing the occurrence of the elastic member sticking to the active matrix during the removal of the rinse.

In accordance with one aspect of the present invention, there is provided a method for manufacturing an array of M×N thin film actuated mirrors, wherein M and N are integers, for use in an optical projection system, the method comprising the steps of: providing an active matrix including a substrate, an array of M×N connecting terminals and an array of M×N transistors, wherein each of the connecting terminals is electrically connected to a corresponding transistor in the array of transistors; depositing a thin film sacrificial layer on top of the active matrix; ion-implanting the thin film sacrificial layer, thereby degrading a structural integrity thereof; creating an array of M×N pairs of empty cavities in the thin film sacrificial layer, one of the empty cavities in each pair being encompassing one of the connecting terminals; depositing an elastic layer, made of an insulating material, on top of the thin film sacrificial layer including the empty cavities; forming an array of M×N conduits, each of the conduits extending from top of the elastic layer to top of a corresponding connecting terminal; depositing a second thin film, a thin film electrodisplacive and a first thin film layers on top of the elastic layer, thereby forming a multiple layered structure including the first thin film, the thin film electrodisplacive, the second thin film and the elastic layers, wherein the second thin film layer is made of an electrically conducting material, and the first thin film layer is made of an electrically conducting and light reflecting material; patterning the multiple layered structure into an array of M×N semifinished actuated mirrors, wherein each of the semifinished actuated mirrors has a top surface and side surfaces, and includes a first thin film electrode, a thin film electrodisplacive member, a second thin film electrode and an elastic member; forming a thin film protection layer completely covering the top surface and the side surfaces of each of the semifinished actuated mirrors; removing the thin film sacrificial layer by using an etchant; rinsing the etchant away by using a rinse; removing the rinse; and removing the thin film protection layer, thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
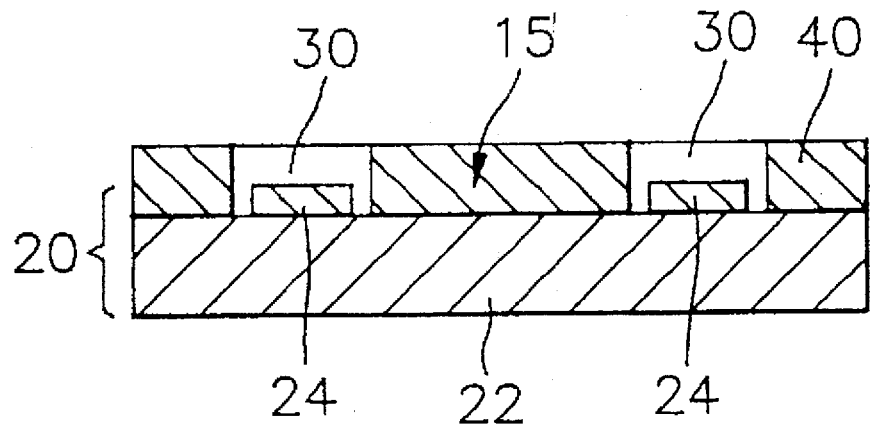
FIGS. 1A to 1G illustrate schematic cross sectional views setting forth manufacturing steps for an array of M×N thin film actuated mirrors previously disclosed.
Figure 1B:
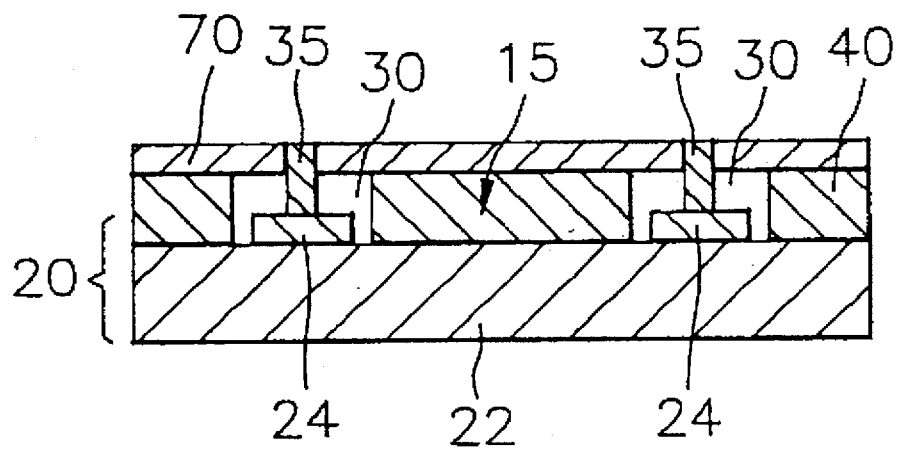
Figure 1C:
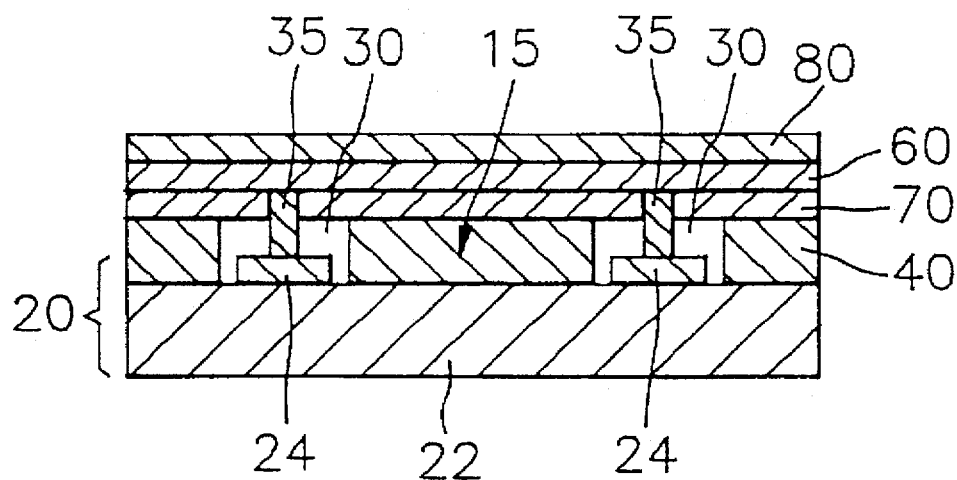
Figure 1D:
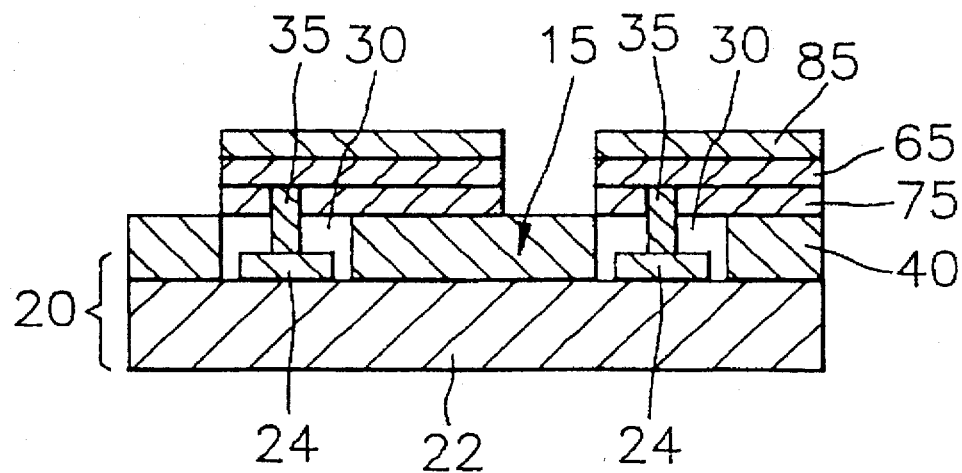
Figure 1E:
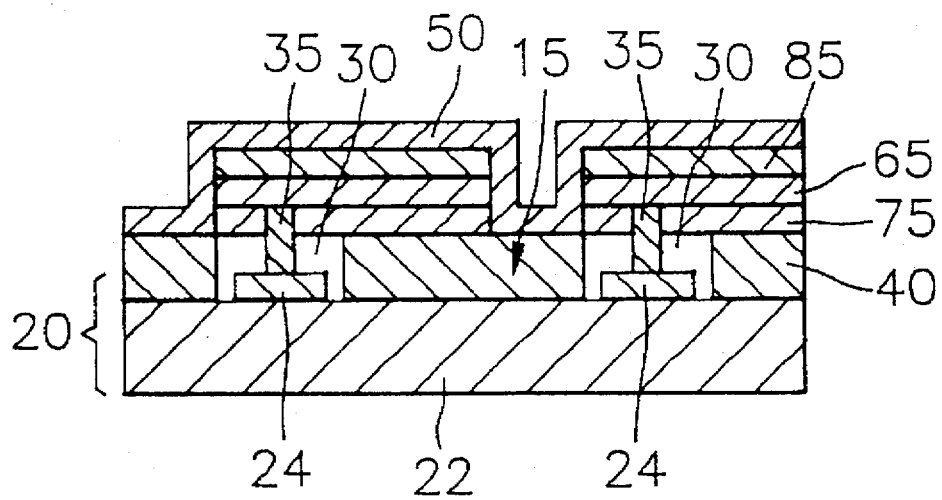
Figure 1F:
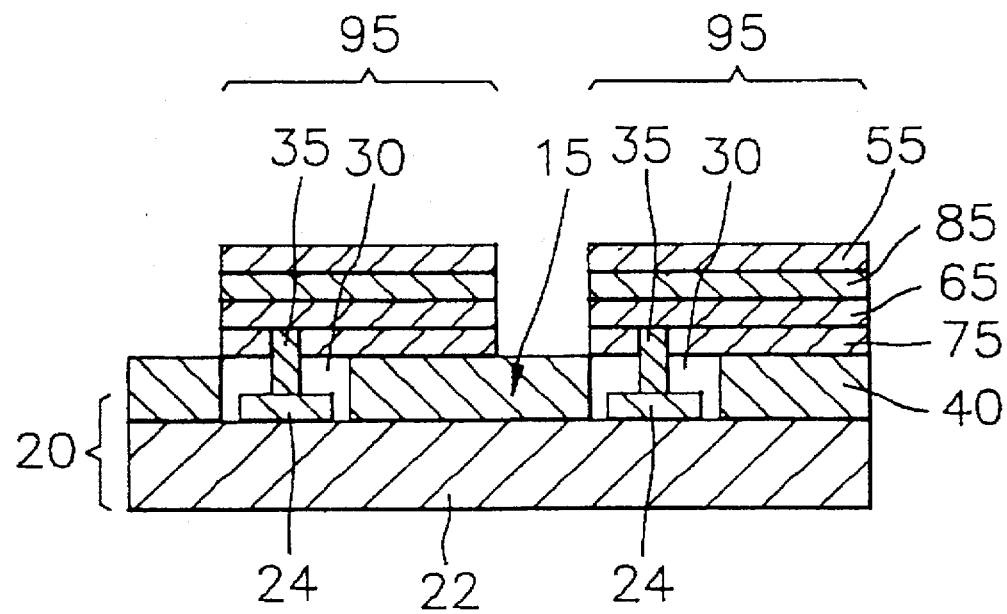
Figure 1G:
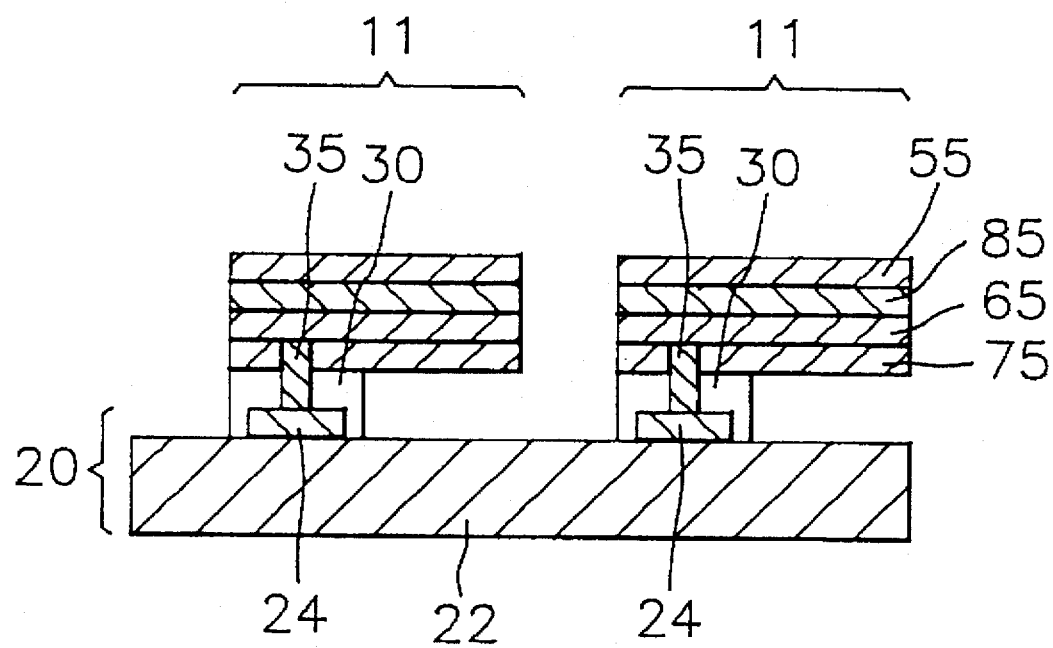

Referring now to FIGS. 2A to 2F, there are provided schematic cross sectional views explaining a method for manufacturing an array 300 of M×N thin film actuated mirrors 301 for use in an optical projection system, wherein M and N are integers, in accordance with preferred embodiments of the present invention. It should be noted that like parts appearing in FIGS. 2A to 2F are represented by like reference numerals.

The process for manufacturing the array 300 begins with the preparation of an active matrix 220 including a substrate 222, an array of M×N connecting terminals 224 and an array of M×N transistors(not shown), wherein the substrate 222 is made of an insulating material, e.g., Si-wafer. Each of the connecting terminals 224 is electrically connected to a corresponding transistor in the array of the transistors.

Figure 2A:
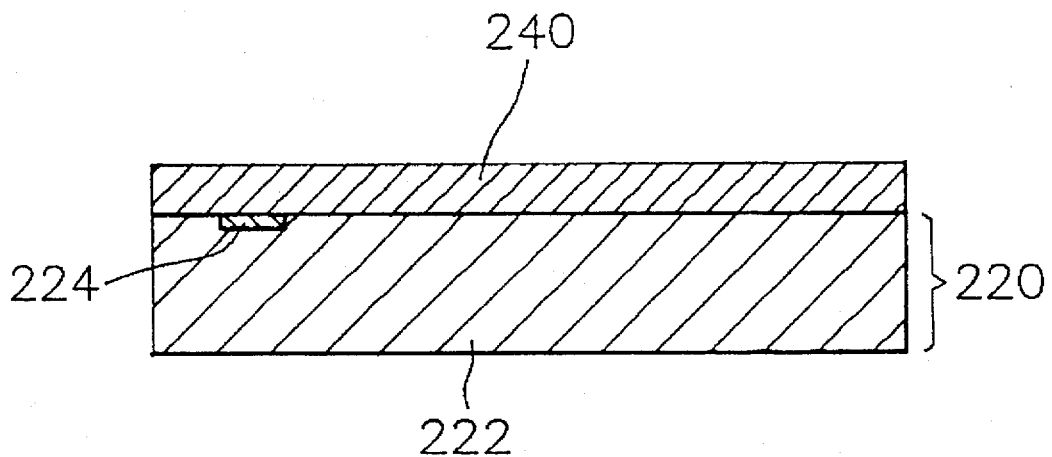
FIGS. 2A to 2F provide schematic cross sectional views explaining an inventive method for manufacturing an array of M×N thin film actuated mirrors.

In a subsequent step, there is formed on top of the active matrix 220 a thin film sacrificial layer 240, having a thickness of 0.1–2 μm, and made of a metal, e.g., copper(Cu) or nickel(Ni), a phosphor-silicate glass(PSG) or a poly-Si, as shown in FIG. 2A. The thin film sacrificial layer 240 is formed by using a sputtering or an evaporation method if the thin film sacrificial layer 240 is made of a metal, a chemical vapor deposition(CVD) method or a spin coating method if the thin film sacrificial layer 240 is made of a PSG, and a CVD method if the thin film sacrificial layer 240 is made of a poly-Si.

Then, the thin film sacrificial layer 240 is ion-implanted with a view to degrade a structural integrity thereof, which will, in turn, improve the etchability thereof during the removal thereof. For example, if the thin film sacrificial layer 240 is made of silicon oxide, the structural integrity thereof can be reduced by ion-implanting thereof with, e.g., boron or phosphorous.

Thereafter, there is formed an array of M×N pairs of empty cavities(not shown) in the thin film sacrificial layer 240 by using a dry or an wet etching method. One of the empty cavities in each pair encompasses one of the connecting terminals 224.

Subsequently, an elastic layer 270, made of an insulating material, e.g., silicon nitride, and having a thickness of 0.1–2 μm, is deposited on top of the thin film sacrificial layer 240 including the empty cavities by using a CVD method.

Figure 2B:
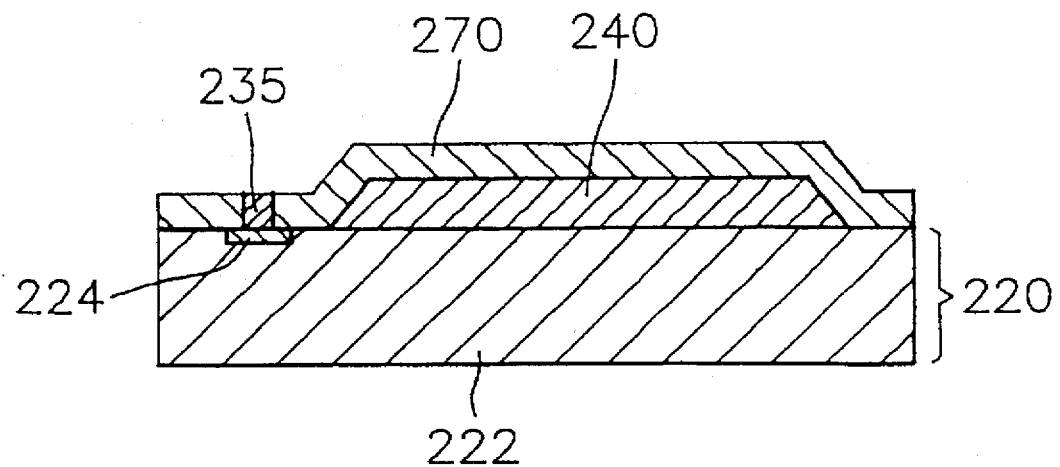

In a next step, there is formed in the elastic layer 270 an array of M×N conduits 235 made of a metal, e.g., aluminum (Al). Each of the conduits 235 is formed by: first creating an array of M×N holes(not shown), each of the holes extending from top of the elastic layer 270 to top of a corresponding connecting terminal 224 by using an etching method; and filling therein with the metal by using, e.g., a lift-off method, as shown in FIG. 2B.

Then, a second thin film layer 260, made of an electrically conducting material, e.g., aluminum(Al), and having a thickness of 0.1–2 μm, is formed on top of the elastic layer 270 and the conduits 235 by using a sputtering or a vacuum evaporation method.

Next, a thin film electrodisplacive layer 280, made of a piezoelectric material, e.g., lead zirconium titanate(PZT), or an electrostrictive material, e.g., lead magnesium niobate (PMN), and having a thickness of 0.1–2 μm, is formed on top of the second thin film layer 260 by using a CVD, a vacuum evaporation, a Sol-Gel or a sputtering method. The thin film electrodisplacive layer 280 is then heat treated to allow a phase transition to take place.

Since the thin film electrodisplacive layer 280 is sufficiently thin, there is no need to pole it in case it is made of a piezoelectric material: for it can be poled with the electric signal applied during the operation of the thin film actuated mirrors 301.

Figure 2C:
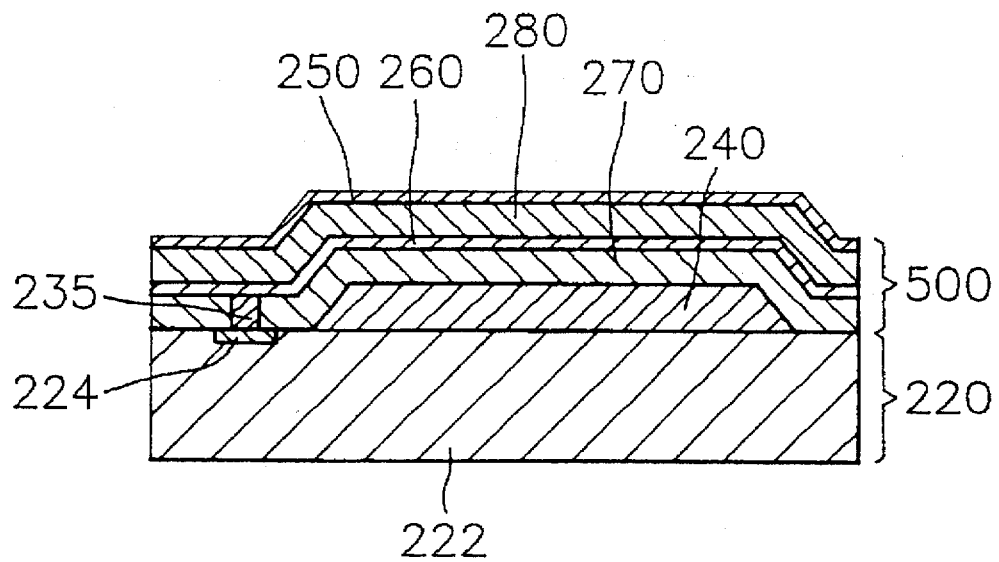

In an ensuing step, a first thin film layer 250, made of an electrically conducting and light reflecting material, e.g., aluminum(Al) or silver(Ag), and having a thickness of 0.1–2 μm, is formed on top of the thin film electrodisplacive layer 280 by using a sputtering or a vacuum evaporation method, thereby forming a multiple layered structure 500 including the first thin film layer 250, the thin film electrodisplacive layer 280, the second thin film layer 260 and the elastic layer 270, as shown in FIG. 2C.

Figure 2D:
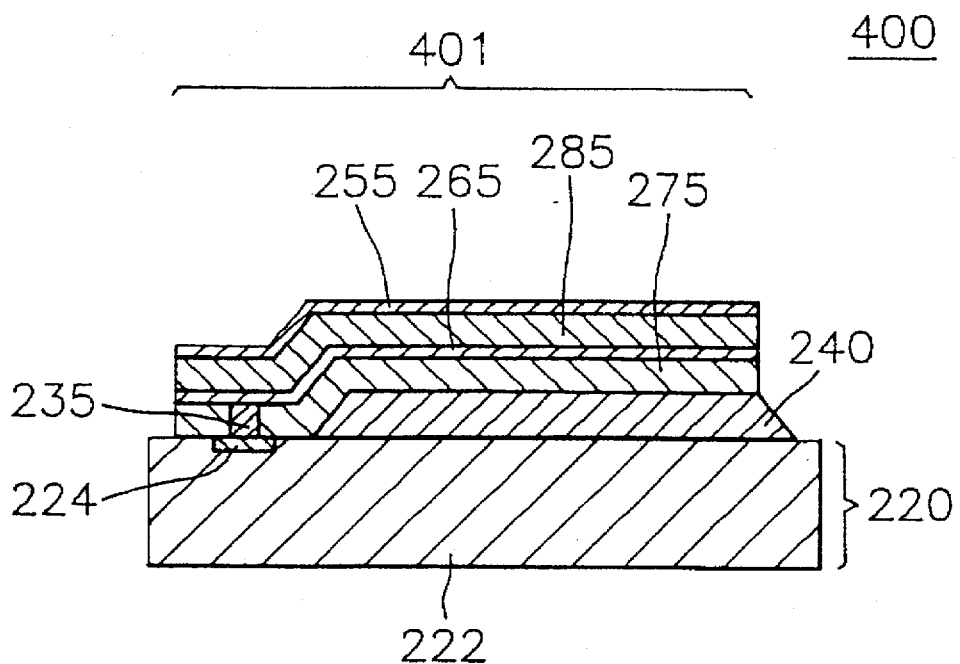

After the above step, the multiple layered structure 500 is patterned into an array 400 of M×N semifinished actuated mirrors 401 by using a photolithography or a laser trimming method, wherein each of the semifinished actuated mirrors 401 has a top surface and side surfaces, and includes a first thin film electrode 255, a thin film electrodisplacive member 285, a second thin film electrode 265 and an elastic member 275, as shown in FIG. 2D.

Figure 2E:
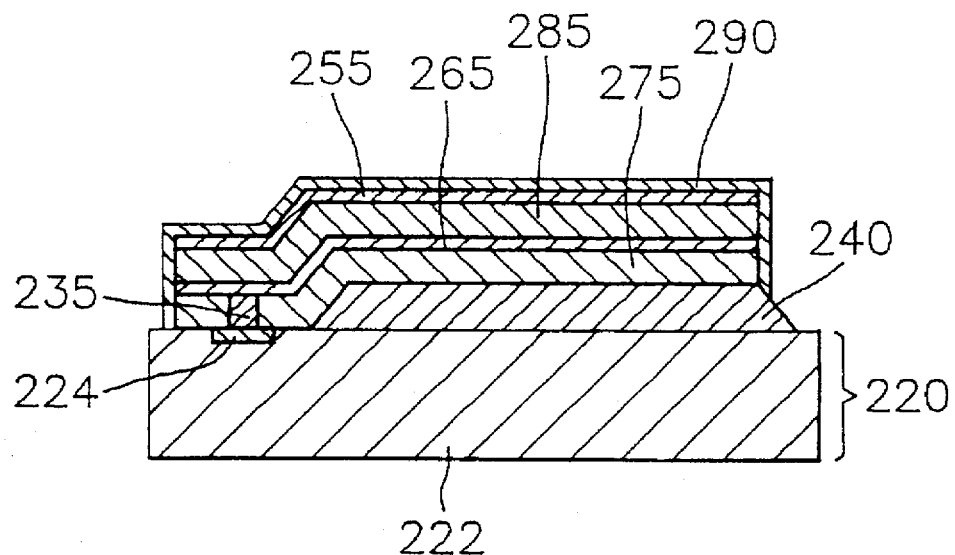

The preceeding step is then followed by completely covering the top surface and the four side surfaces in each of the semifinished actuated mirrors 401 with a thin film protection layer 290, as shown in FIG. 2E.

The thin film sacrificial layer 240 is then removed by using an wet etching method employing an etchant, e.g., hydrogen fluoride(HF).

Figure 2F:
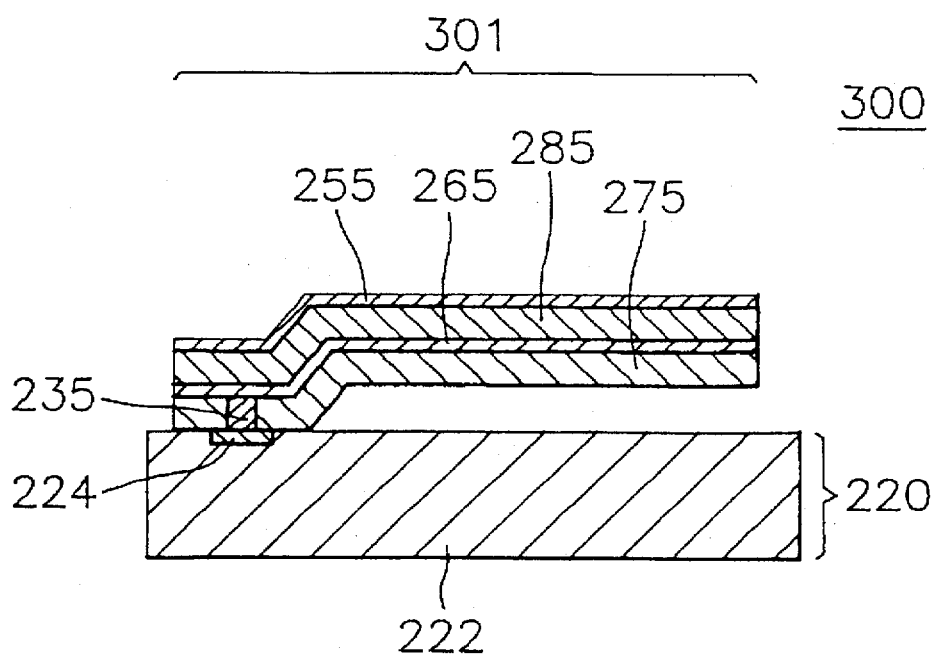

The etchant is rinsed away by using a rinse, e.g., distilled water or methanol. Then, the rinse is normally removed by first solidifying it and then sublimating it. And this can achieved by exposing the rinse to appropriate conditions. Finally, the thin film protection layer 290 is removed to thereby form the array 300 of M×N thin film actuated mirrors 301, as shown in FIG. 2F.

In contrast with the method for manufacturing the array 10 previously disclosed, in the inventive method, since the thin film sacrificial layer 240 is ion-implanted with a view to degrade the structural integrity thereof, which will, in turn, improve the etchability thereof during the removal thereof, thereby facilitating the removal thereof.

In addition, since the removal of the rinse is achieved by first solidifying it, and then sublimating it, the affect of the surface tension of the rinse can be ignored and therefore, there is less likelihood of the elastic member 275 in each of the thin film actuated mirrors 301 sticking to the active matrix 220.

It should be mentioned that, even though, each of the thin film actuated mirrors 301 prepared using the inventive method has an unimorph structure, the inventive method can be equally well applied to manufacturing an array of thin film actuated mirrors, each of the thin film actuated mirrors having a bimorph structure, for the latter case just involves formation of additional electrodisplacive and electrode layers.

It should be further noted that the inventive method can be modified to allow a manufacturing an array of thin film actuated mirrors having a different geometry.

While the present invention has been described with respect to certain preferred embodiments only, other modifications and variations may be made without departing from the scope of the present invention as set forth in the following claims.

What is claimed is:

1. A method for manufacturing an array of M×N thin film actuated mirrors, wherein M and N are integers, for use in an optical projection system, the method comprising the steps of:

providing an active matrix including a substrate, an array of M×N connecting terminals and an array of M×N transistors, wherein each of the connecting terminals is electrically connected to a corresponding transistor in the array of transistors;

depositing a thin film sacrificial layer on top of the active matrix;

ion-implanting the thin film sacrificial layer, thereby degrading a structural integrity thereof;

creating an array of M×N pairs of empty cavities in the thin film sacrificial layer, one of the empty cavities in each pair being encompassing one of the connecting terminals;

depositing an elastic layer, made of an insulating material, on top of the thin film sacrificial layer including the empty cavities;

forming an array of M×N conduits, each of the conduits extending from top of the elastic layer to top of a corresponding connecting terminal;

depositing a second thin film, a thin film electrodisplacive and a first thin film layers on top of the elastic layer, thereby forming a multiple layered structure including the first thin film, the thin film electrodisplacive, the second thin film and the elastic layers, wherein the second thin film layer is made of an electrically conducting material, and the first thin film layer is made of an electrically conducting and light reflecting material;

patterning the multiple layered structure into an array of M×N semifinished actuated mirrors, wherein each of the semifinished actuated mirrors has a top surface and side surfaces, and includes a first thin film electrode, a thin film electrodisplacive member, a second thin film electrode and an elastic member;

forming a thin film protection layer completely covering the top surface and the side surfaces of each of the semifinished actuated mirrors;

removing the thin film sacrificial layer by using an etchant;

rinsing the etchant away by using a rinse;

removing the rinse; and removing the thin film protection layer, thereby forming the array of M×N thin film actuated mirrors.

2. The method of claim 1, wherein the thin film sacrificial layer is formed in a thickness of 0.1–2 μm.

3. The method of claim 1, wherein the thin film sacrificial layer is made of silicon oxide.

4. The method of claim 3, wherein the thin film sacrificial layer is ion-implanted with boron or phosphorous.

5. The method of claim 1, wherein the etchant used in the removal of the thin film sacrificial layer is hydrogen fluoride (HF).

6. The method of claim 1, wherein the rinse is distilled water or methanol.

7. The method of claim 6, wherein the rinse is removed by:

solidifying it; and sublimating it.

8. The method of claim 1, wherein each of the thin film actuated mirrors has a bimorph structure.

9. The method of claim 8, further involves the formation of additional electrodisplacive and electrode layers.

* * * * *